(No Model.)
W. CURLETT.
HOSE COUPLING.
No. 541,596. Patented June 25, 1895.
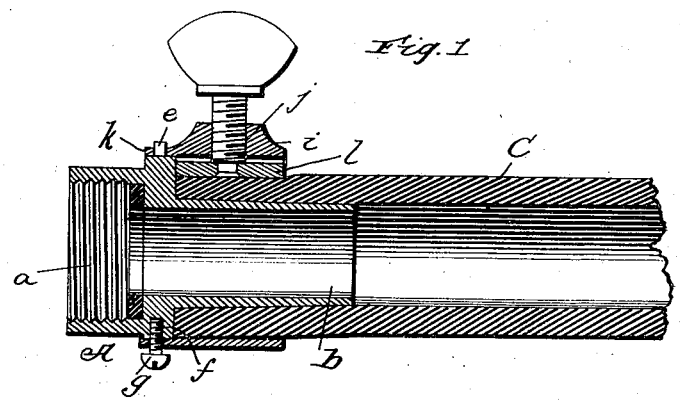
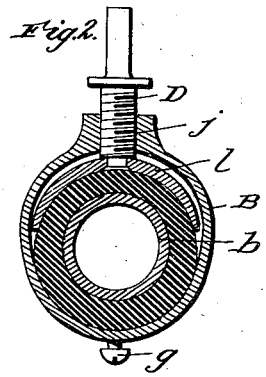
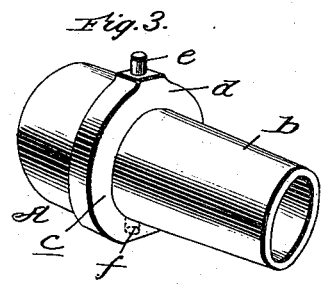
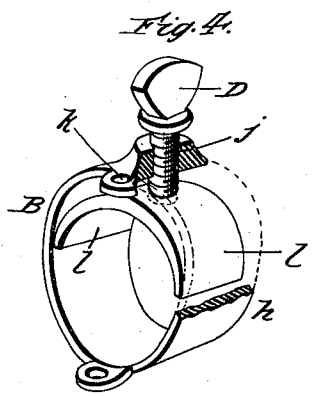
Witnesses:
Inventor
Wm. Curlett
By James J. Sheehy
Attorney

UNITED STATES PATENT OFFICE.

WILLIAM CURLETT, OF SAN FRANCISCO, CALIFORNIA.

HOSE-COUPLING.

SPECIFICATION forming part of Letters Patent No. 541,596, dated June 25, 1895.

Application filed October 5, 1894. Serial No. 524,994. (No model.)

*To all whom it may concern:*

Be it known that I, WILLIAM CURLETT, a citizen of the United States, residing at San Francisco, in the county of San Francisco and State of California, have invented certain new and useful Improvements in Hose-Couplings; and I do declare the following to be a full, clear, and exact description of the invention, such as will enable others skilled in the art to which it appertains to make and use the same.

This invention has relation to improvements in hose couplings, and while it is designed more particularly for use in coupling a rubber or flexible hose to a street washer or garden faucet, yet it may be advantageously and conveniently used for connecting two sections of a pipe or hose together.

The invention and its many objects and advantages will be fully understood from the following description and claims when taken in connection with the annexed drawings, in which—

Figure 1 is a longitudinal central sectional view of my improved device, showing a part of a rubber or flexible hose attached. Fig. 2 is a transverse sectional view of the same. Fig. 3 is a perspective view of the coupling and bearing sections, and Fig. 4 is a perspective view of the clamping-section, partly broken away.

Referring by letter to said drawings: A, indicates the coupling section. This section is of a form, substantially as shown in Fig. 3, of the drawings, having one end internally screw tapped as at $a$, for attachment to a threaded pipe, hose bib, or garden faucet, as the case may be. This section has its opposite end tapering as shown at $b$, and at the inner end of this tapering extension, is an annular flange $c$, which forms a shoulder $d$, against which the end of the hose C, is forced as shown in Fig. 1, of the drawings. This flange is provided externally and at diametrical opposite points, with a lateral lug $e$, and a screw tapped aperture $f$, to receive a screw $g$, as will be presently described.

B, indicates the clamping section. This section comprises a band $h$, which is of a peculiar construction being of an oval form in elevation and tapering from one end to the other. This clamping section is increased in thickness at $i$, and screw-tapped through this thickened portion as shown at $j$, to receive a clamping screw D. This section is also provided on its large end with two diametrically-arranged, perforated ears $k$, to respectively receive the lug $e$, and the screw $f$, whereby the sections are connected together. Within the swell or enlarged portion of the band $h$, is a clamp $l$, which is of a semi-circular form, or approximately so, and has swiveled in or otherwise attached to it, the inner end of the clamping screw D. This clamp should also have a slight taper to correspond with the taper of the bearing $b$, for the interior of the hose.

From the construction described, it will be seen that the clamping section is detachably connected with the coupling and bearing sections, and that the clamp and its band assume a position against the shoulder $d$, and surrounds the conical or tapering bearing $b$.

In operation, the section A, is first screwed on to the garden-faucet, street-washer, or the like. The clamp being drawn outwardly within the band, the hose to be coupled is then forced over the bearing $b$, and up against the shoulder $d$, after which the clamping screw is turned so as to bring the clamp $l$, forcibly against the hose so as to confine the latter firmly upon the conical or tapering bearing of the section A. When it is desired to remove the hose, it is simply necessary to loosen the clamp by reversing the movement of the screw D, when the hose can be drawn off of the bearing and out of the clamp.

In using the device on a garden faucet, the coupling may be screwed thereon and allowed to remain, and it may be found convenient in the manufacture to have the garden hose-bib or valve made as a part of the coupling, in which case, the whole may be formed in one piece and save the expense of the double threads.

While I have described very specifically and in detail, the parts and their combinations, precisely as shown, yet I am aware that some of the parts may be modified without departing from the spirit of my invention.

Having described my invention, what I claim is—

1. A hose coupling comprising the coupling section having one end internally screw-tapped, and its opposite end provided with a conical or tapering bearing to receive a hose section, and the band adapted to be attached to the coupling section and provided with a threaded bearing, a clamping screw arranged in said bearing and a clamp carried by said screw to confine the hose upon the tapering bearing of the coupling section, substantially as specified.

2. The section A, screw-tapped at one end, and having a tapering, tubular bearing at its opposite end, a shoulder at the inner end of said tapering bearing-tube, and a stud on said shoulder, and a screw-tapped aperture at a diametrically-opposite point to said stud, in combination with the band having perforated ears to receive the stud and also a screw for connection with the coupling section, and also having a transverse, screw-tapped bearing, the screw taking into said bearing, and the clamp carried by said screw, the whole adapted to operate, substantially as specified.

In testimony whereof I affix my signature in presence of two witnesses.

WILLIAM CURLETT.

Witnesses:
P. A. PIODA,
ROBERT MCELROY.